United States Patent
Rene

(10) Patent No.: US 6,331,090 B1
(45) Date of Patent: Dec. 18, 2001

(54) DEVICE FOR CONNECTING CONTAINERS

(75) Inventor: Svein Rene, Tonsberg (NO)

(73) Assignee: Uniteam ASA, Oslo (NO)

( * ) Notice: Subject to any disclaimer, the term of this patent is extended or adjusted under 35 U.S.C. 154(b) by 0 days.

(21) Appl. No.: 09/509,562

(22) PCT Filed: Oct. 12, 1998

(86) PCT No.: PCT/NO98/00308

§ 371 Date: Apr. 17, 2000

§ 102(e) Date: Apr. 17, 2000

(87) PCT Pub. No.: WO99/20546

PCT Pub. Date: Apr. 29, 1999

(30) Foreign Application Priority Data

Oct. 17, 1997 (NO) ................................................ 19974828

(51) Int. Cl.[7] ..................................................... B65D 1/30
(52) U.S. Cl. ........................ 403/286; 403/314; 403/257; 403/20; 220/4.34
(58) Field of Search ................................ 403/286, 12, 20, 403/43, 46, 257, 261, 291, 309, 314, 315, 316, 317, 322.4; 285/424, 242; 220/1.5, 4.23, 4.33, 4.34, 314, 321, 322, 324, 340

(56) References Cited

U.S. PATENT DOCUMENTS

| | | | |
|---|---|---|---|
| 2,354,045 | * | 7/1944 | Nystrom et al. ..................... 285/242 |
| 3,685,863 | * | 8/1972 | Oetiker ............................. 403/317 X |
| 5,259,691 | * | 11/1993 | Moore et al. ..................... 403/314 X |
| 5,694,729 | * | 12/1997 | Blackburn et al. .............. 403/316 X |

* cited by examiner

Primary Examiner—Lynne H. Browne
Assistant Examiner—David E. Bochna
(74) Attorney, Agent, or Firm—Dennison, Scheiner, Schultz & Wakeman

(57) ABSTRACT

Device for establishing a gastight and fluidtight connection in a horizontal level between two or more containers (100, 200) of the iso-container type. The device includes a substantially band shaped, elastic sealing member (300) which surrounds an opening (20) between the containers to be connected and which is arranged on a supporting surface (105). A pressure exerting member (130) is provided to hold the sealing member (300) tightly against the supporting surface (105) with tightening members (400) to force the sealing member (300) against the supporting surface (105). The sealing member (300) in mounted position is arranged with a generally rectangular cross section and is placed against a supporting surface (105) on the respective containers, generally extending in the main level of the respective containers. The pressure exerting member constitutes at least four generally band shaped members (130) arranged at the respective flat supporting surfaces (105) of a container (100). The pressure exerting member (130) is furthermore connected to the container with a hinge member (131) along one of its long edges and is provided with through openings (132). A number of holding members (160) are firmly attached to the supporting surface (105) and are evenly distributed along the entire light opening of the container. A plurality of tightening members (400) are arranged to enter the respective holding members (160) and to force the pressure exerting member (130) against the sealing member (300) and the supporting surface (105).

10 Claims, 5 Drawing Sheets

DEVICE FOR CONNECTING CONTAINERS

The invention concerns a device for a gastight and fluid tight connection between transport containers of the isocontainer type as described by the introductory of claim 1.

BACKGROUND

Transport containers, usually designated containers, are widely used for civil as well as military purposes and/or transportation of different type of goods by sea, by train, with container trucks, or by air planes etc. The containers are designed with a framework of steel and a base (floor), side walls and top of flat or profiled sheets. The containers are often provided with swing doors at the short end walls.

In military applications containers are often used for transporting different types of equipment, like weapons, clothes, tools etc, from a storehouse to e.g. a combat area where the containers are emptied when needed and left behind. In an attempt to make the most of such containers, office units have been made by cutting out openings for doors and windows in the container side walls. This solution is however not satisfactory for more than one reason. Firstly one is not able to establish a sufficient seal against war gases, secondly the container will be rendered unsuitable for its original purpose unless major repair work is undertaken subsequent to its secondary use.

U.S. Pat. No. 3,061,134 describes a container "solution" where the purpose is to provide a construction that can be used alone and in a combination with two container parts connected end to end. This is achieved by providing an end wall of the container with a band shaped tightening member 35 which surrounds the light opening of the container end wall 21. The end wall further comprises a stop member 36 with an area corresponding to the tightening member in order to reduce the pressure strain on the tightening member and to protect the latter against mechanical strain both when connected and in stand-alone condition.

In a connected condition a substantially equally formed container unit is moved towards the first container unit in such a way that the respective tightening members 35 and stop members 36 are brought in face-to-face contact with each other. The container units are held together this way by use of a locking member 42 arranged in each corner of the light opening, whereby each locking member generally consists of a bolt 43 projecting through a hole in the edge of the end wall, a locking pin 61 to lock the bolt tightly in the hole and a handle 56 to bring the bolt from a locked to an open position and vice versa.

By this construction the relatively narrow sealing/gasket 35 is established only on the supporting area of the respective container units. This embodiment in combination with the stop members 36 requires an exact positioning of the container units for the attachment procedure. In addition the combination of sealing/gasket 35 and stop member 36 will hardly offer a seal that is sufficient to establish a required elevated pressure or reduced pressure in the internal container volume. Another substantial disadvantage with the known device is that the pressure exerting members 42 are relatively long and partly extend into the opening which is established between the container units when they are connected. Such a design therefore will strongly limit the possibilities of establishing a free passage between connected containers. Further it is doubtful whether the known construction is at all suitable for connecting more than two containers.

NO A 974411 discloses a device for connecting two or more containers of the isocontainer type horizontally or vertically. This design generally comprises a band shaped elastic sealing member which surrounds an opening between the containers to be connected to each other and which is placed on a supporting surface, as well as attachment members to force the sealing member against a supporting surface and against the opening between the same. In a preferred embodiment a frame shaped supporting surface is arranged on each of the container walls to be connected to a similarly shaped second container, and the preferably seamless band shaped sealing member is stretched from a vertically oriented supporting surface on the first container over the gap between the same and to a vertically oriented supporting surface on the second container. A substantially frame shaped pressure exerting member is arranged close to the vertically oriented surface of the sealing member on each of the containers. The attachment members then ensure that the gasket in between the containers is forced against the supporting surface, thereby providing a fluid tight and gastight connection between each of the attachment members and the supporting surfaces, and thus between the first and the second container. In this way a gas and fluid tight complex of (several) containers may be achieved.

While this previously known design does enable a further utilisation of transport containers and established a gastight connection between such containers in a larger building complex, it has several disadvantages such as the attachment members needing to be retightened if the containers are mutually displaced.

THE OBJECTIVE

The objective of the present invention is to provide an improved device for connecting transport containers which is easy to use and inexpensive for providing a building complex of containers and which prevents any intrusions of water and gas into the complex.

THE INVENTION

These objectives are achieved by a device according to the characterizing part of claim 1. Further beneficial features are disclosed by the dependent claims.

The invention concerns a device for establishing a horizontal connection between two or more containers of the isocontainer type, whereby the device includes a substantially band shaped elastic sealing member which surrounds an opening between containers to be connected and is arranged on a supporting surface. Pressure exerting members are provided to hold the sealing member tightly against the supporting surface with tightening member(s) to force the sealing member against the supporting surface.

According to the invention the band shaped and preferably continuous sealing member which in a mounted position has a substantially rectangular cross section, is arranged on respective supporting surfaces of the respective containers which is generally level with the respective main levels of the container. Further, the pressure exerting member constitutes at least four substantially board shaped members arranged at the respective flat supporting surfaces (walls, bottom, top) of a container. The pressure exerting member along one of its long side edges is thereby connected by hinge members to the container so it can swing from an elevated position to a lower position. The pressure exerting member is also furnished with through holes for receiving the holding members that are described below. A number of holding members, preferably U-shaped, with legs firmly attached to the supporting surface are distributed along the entire light opening (or the free passage) between the containers. The board shaped pressure exerting member is by the aid of several tightening members forced into encroachment with the respective holding members, thereby forcing the pressure exerting member against the sealing member and the supporting surface.

In a preferred embodiment the connection device according to the invention is arranged in a counterbore at the end edges of the container.

To protect the sealing material against mechanical damage and/or damage from aggressive fluids or gases, a free floating outer supporting board is preferably arranged in the region between the supporting surface and the sealing member and over the free space between the two adjacent containers.

The width of this board must be at least a little bit wider than the normal distance between two adjacent containers.

Similarly, a free movable inner supporting board is preferably arranged in the region between the sealing member and the underside of the pressure exerting members of the respective containers.

In a preferred and practical embodiment, the tightening member is designed as a hook with a handle, whereby the hook has a pointed free end and is gradually thicker towards the handle. The hook is shaped with an outer dimension that allows it to penetrate the remaining free space between the inner part of the hoop and the upside of the board shaped pressure exerting member. This allows the exertion of a pressure force on the pressure exerting member by lowering the handle of the tightening member.

In order to make it easy to establish EMP safeguarding for military purposes (safeguarding against electromagnetic pulses from nuclear detonations) and to further increase the tightening effect, a bar shaped supporting member is arranged on the supporting surface, the surface of the supporting member exhibiting projections or bars in a direction towards the sealing member. The purpose of the bars are to serve as a foundation for electric conductive material for EMP safeguarding and an extra barrier especially against fluid intrusion.

To enhance the pressure force on the sealing member further, a spacing member designed as a board or sheet shaped disc with a through opening, may if required be placed with its opening over the holding member on the top of the pressure exerting member.

To accommodate the mounting procedure of the connecting device (in the corners), the pressure exerting member may also be provided with an extra hinged part which enables exposure of a free space in the corner. This reduces damage to the sealing member when the pressure exerting member is lowered described hereinafter.

Dimensions and choice of material for the respective components are within the knowledge of a person skilled in the art, and are not further described here.

The improved design has firstly the advantage that the member which forces and holds the pressure exerting member against the sealing, and thus establishes a gastight connection, does not depend upon the mutual position of the containers. Two connected containers can therefore to a greater extent be allowed to move mutually both vertically and horizontally. Another advantage with the invention is that the need for retightening of the pressure exerting member in order to maintain the sealing is minimalized. In the preferred embodiment where the device has a counterbore in the edge of the container wall, one will achieve a passage between two containers that is level with the respective floors and as a result of this also a larger height to the ceiling.

Other advantages with the present device is that it is easier and less expensive to produce, it gives better sealing, significantly reduces the possibility of erroneous mounting, has fewer loose parts, requires reduced sealing (gasket) size and provides a substantially easier mounting.

In an overall context the present invention thus provides a significant improvement over the connecting devices known from the prior art.

BRIEF DESCRIPTION OF THE DRAWINGS

In the following the invention is described more in detail by use of an example and the accompanying drawings, where.

DETAILED DESCRIPTION OF THE PREFERRED EMBODIMENT

Figure 1:
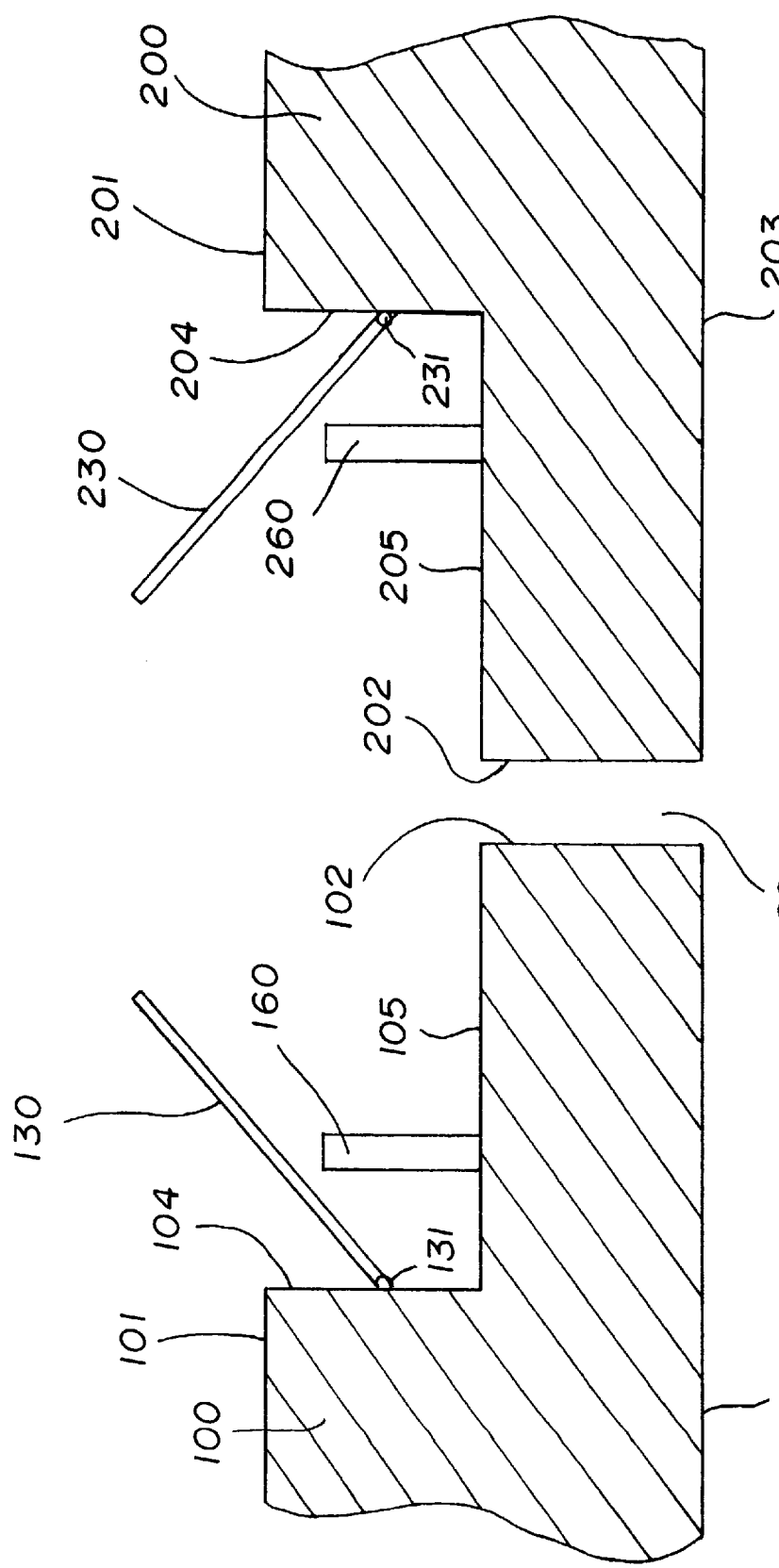
FIG. 1 shows a cross sectional view through the floor section of two adjacent containers ready to be fitted with connecting members etc.

FIG. 1 shows a first and a second container 100 and 200 with a floor level 101 and 201 localized adjacent to each other with a free passage 20. In the following, for the sake of simplicity, only the features of one container is described as the other has corresponding components. The outer wall at the corner (edge) of the lower part of the container facing the adjacent container, is designated 102. The underside 103 of the container rests on a suitable, mainly flat foundation (not shown). In a preferred embodiment a counterbore is arranged in the edge area of the container, having a substantially vertical wall section 104 and a substantial horizontal surface 105. The surface 105 according to this embodiment, serves to support the sealing member as described in further detail below, and also provides a lowering of the floor in order to enhance the effective height to the ceiling in the region of the connection, as well as providing a shelter for the connecting device with a protecting cover especially on the floor. A pressure exerting member 130, here in the form of a band shaped board, is attached to the vertical wall section 104 of the container with the aid of a hinge member 131. Member 130 is free to swing about one end (a long end) from a position substantially horizontal to a position substantially vertical. The pressure exerting member 130 has further been provided with a series of through holes (best shown by 132 of FIG. 2) for reception of substantially hoop shaped (U-shaped) members 160 attached to the supporting surface 105. The cross section showed in FIG. 1 has a corresponding shape about the entire circumference of the light opening, e.g. an entire long side of a container, or a part of a long side, or a short side of a container. That is to say the pressure exerting member 130 has been provided with said holes (132 of FIG. 2) substantially all the way around the circumference of the light opening, the holes and corresponding holding members (160) preferably being distributed equally around said circumference.

Figure 3:
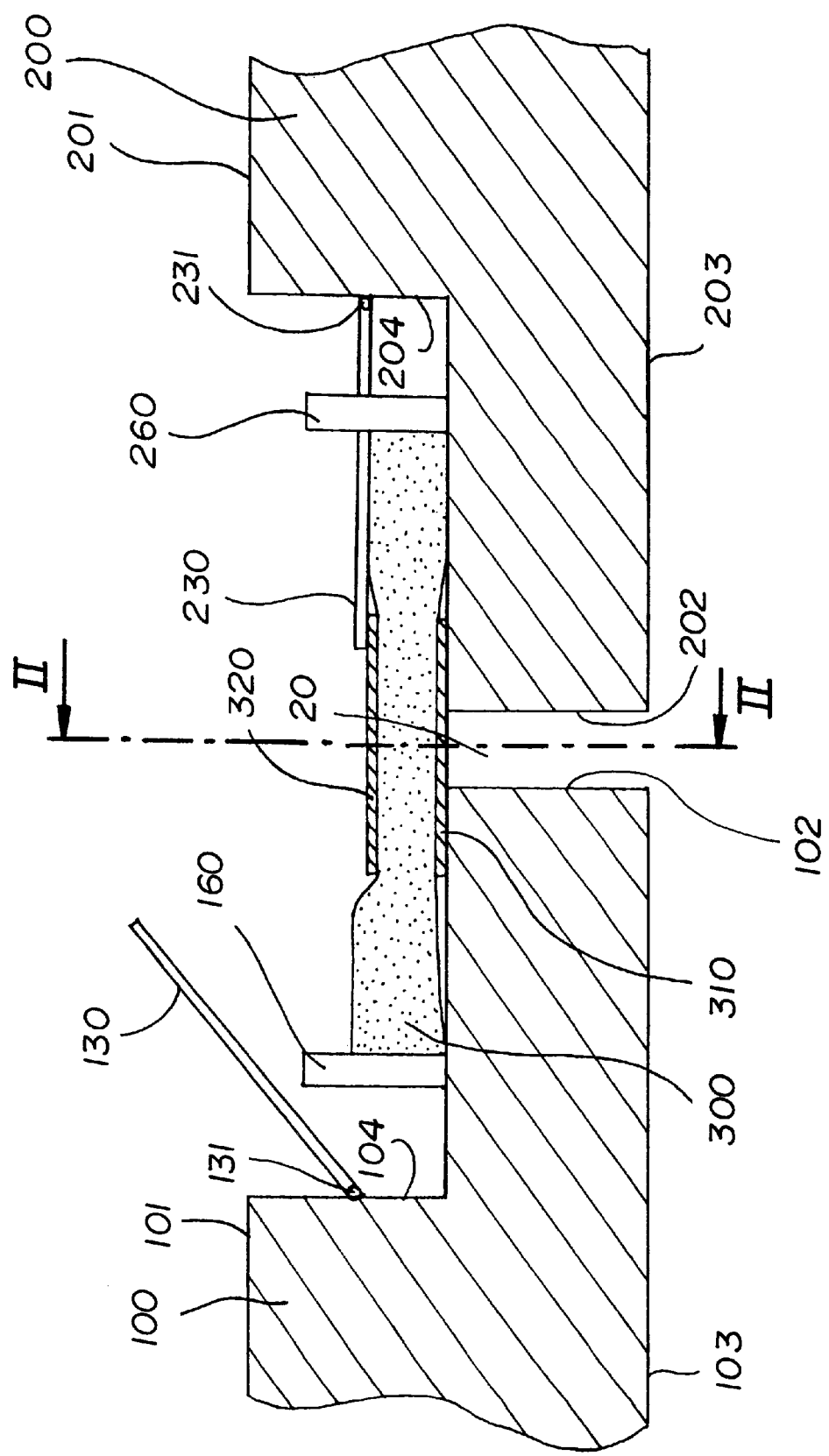
FIG. 3 shows a cross sectional view corresponding to FIG. 1, except that the sealing member is in the process of being mounted.

FIG. 3 shows a cross section corresponding to FIG. 1, except that the connecting device is in the process of assuming a gas-tight connection between the two containers. A substantially band shaped sealing member 300 of a suitable elastic material, e.g. rubber is provided between the U-shaped holding member 160 and 260 of the respective adjacent containers 100 and 200.

In a preferred embodiment there is arranged a "floating" generally rigid protection board 310 (outer protection board), partly to protect the sealing against mechanical stress from the corners (edges) of the containers and partly to establish extra protection of the sealing material against aggressive media in the form of gases or liquids. The outer protection board 310 is shaped with a relatively small thickness and is allowed to move freely, independent of the mutual movement of the containers. In this way one can obtain a better protection and at the same time allow a certain mutual movement of the containers.

In FIG. 3 the pressure exerting member 230 of the second container 200 has been lowered onto the sealing member 300 to accommodate the through holes of the pressure exerting member (see FIG. 2 and accompanying description) and compress the sealing member in order to establish a gas- and fluid tight connection in the passage to the other container. The gasket 300 in the region of the first container is still uncompressed and rests on the outer protecting board 310 and the supporting surface 105 of the first container 100.

Figure 2:
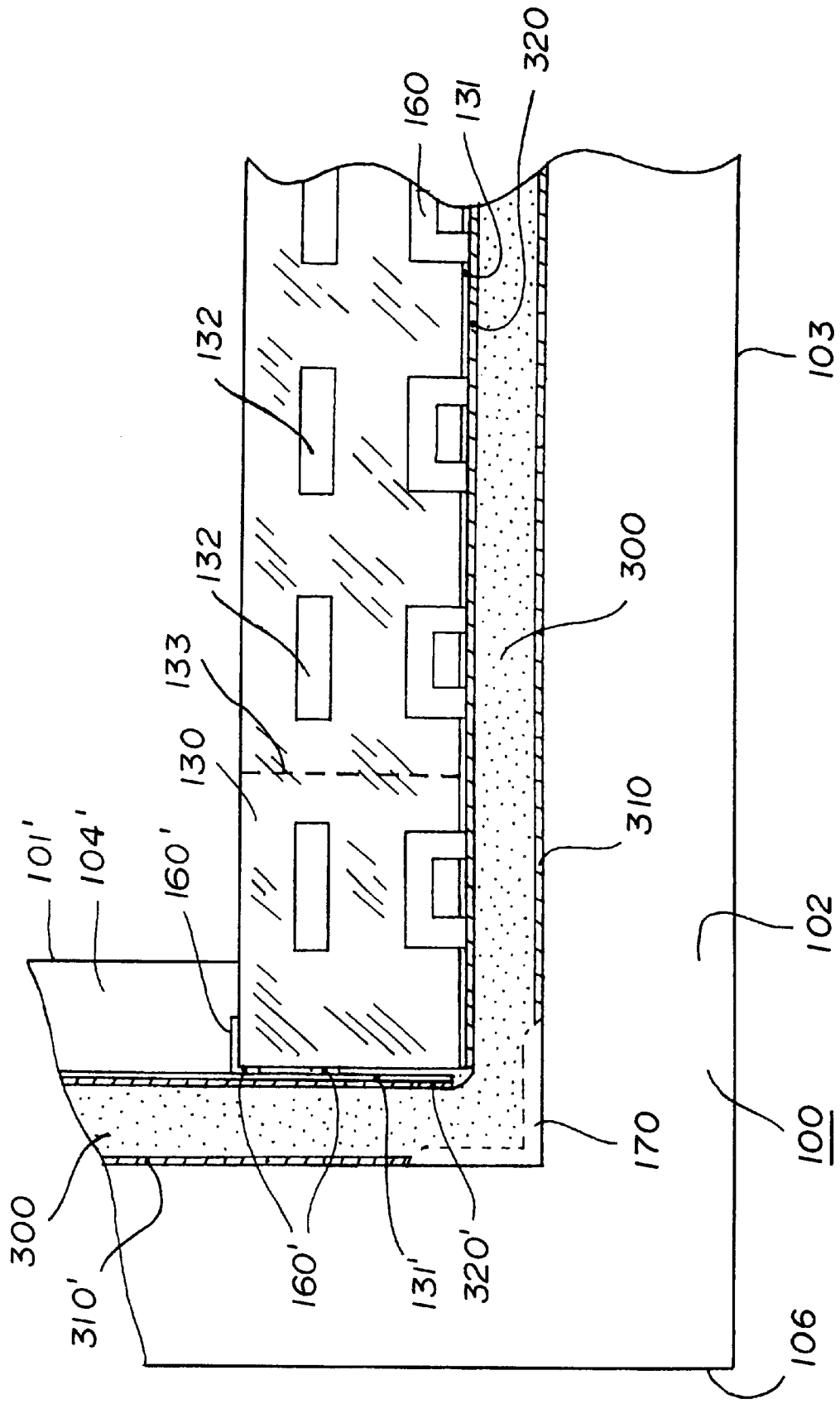
FIG. 2 shows a cross sectional view vertically through a region between two connected containers according to line II—II of FIG. 3.

FIG. 2 shows the connecting device according to the invention in a cross section along the line II—II of FIG. 3. More particularly the Figure shows a certain part of the lower left corner of the container 100 with container floor 103, front wall 102 facing the adjacent container 200 (not shown) and outer side wall 106. The inner wall of the container is shown as 101, while the attachment board for the pressure exerting member is shown as 104.

From bottom to top in the horizontal cross section of the container, there is shown the outer protection board 310, sealing member or gasket 300, preferably an inner protection board 320 (see also FIG. 4 with corresponding explanation) as well as hinge member 131 for the corresponding board shaped pressure exerting member 130. The holding members 160 are here designed as U-shaped hoops, of which only the upper parts are shown projecting in the region behind the sealing member 300 and protection boards 310 and 320. In the board shaped pressure exerting member 130 holes 132 are formed in positions corresponding to the respective holding members 160 so that the pressure exerting member can be lowered over the holding members.

The vertical section of the container cross section parallel to wall 106 shows sealing member 300 with corresponding protection boards 310' and 320' (FIG. 2) corresponding to the horizontal section. Here the pressure exerting member 130' has been lowered over the corresponding holding members 160'. The end position for the horizontal board shaped pressure exerting member 130 is adjusted to the height (or the distance from the supporting surface for the vertical pressure exerting member 130') so that the horizontal pressure exerting member 130 can swing freely without conflicting with the lowered vertical pressure exerting member 130' (or vice versa, dependent upon the order of assembling).

In order to achieve an extra compression of the gasket in the corner area, there is arranged a substantially rigid angular profile 170 in contact with the supporting surface of this section. A corresponding separate angular profile may be arranged on the other container, and correspondingly in the inner corner part of the pressure exerting members 130 and 130' (facing the interior of the container (not shown).

As described above, in order to case the mounting procedure of the corner sections of the connecting device, the pressure exerting member 130 may also be provided with an extra hinged part 133 oriented substantially perpendicularly to the hinge member 131 thus establishing a flap at the end of the pressure exerting member 130. This flap may be folded aside to expose a free space at the corner in order to reduce damage to the sealing member when lowering the adjacent pressure exerting member.

Figure 4:
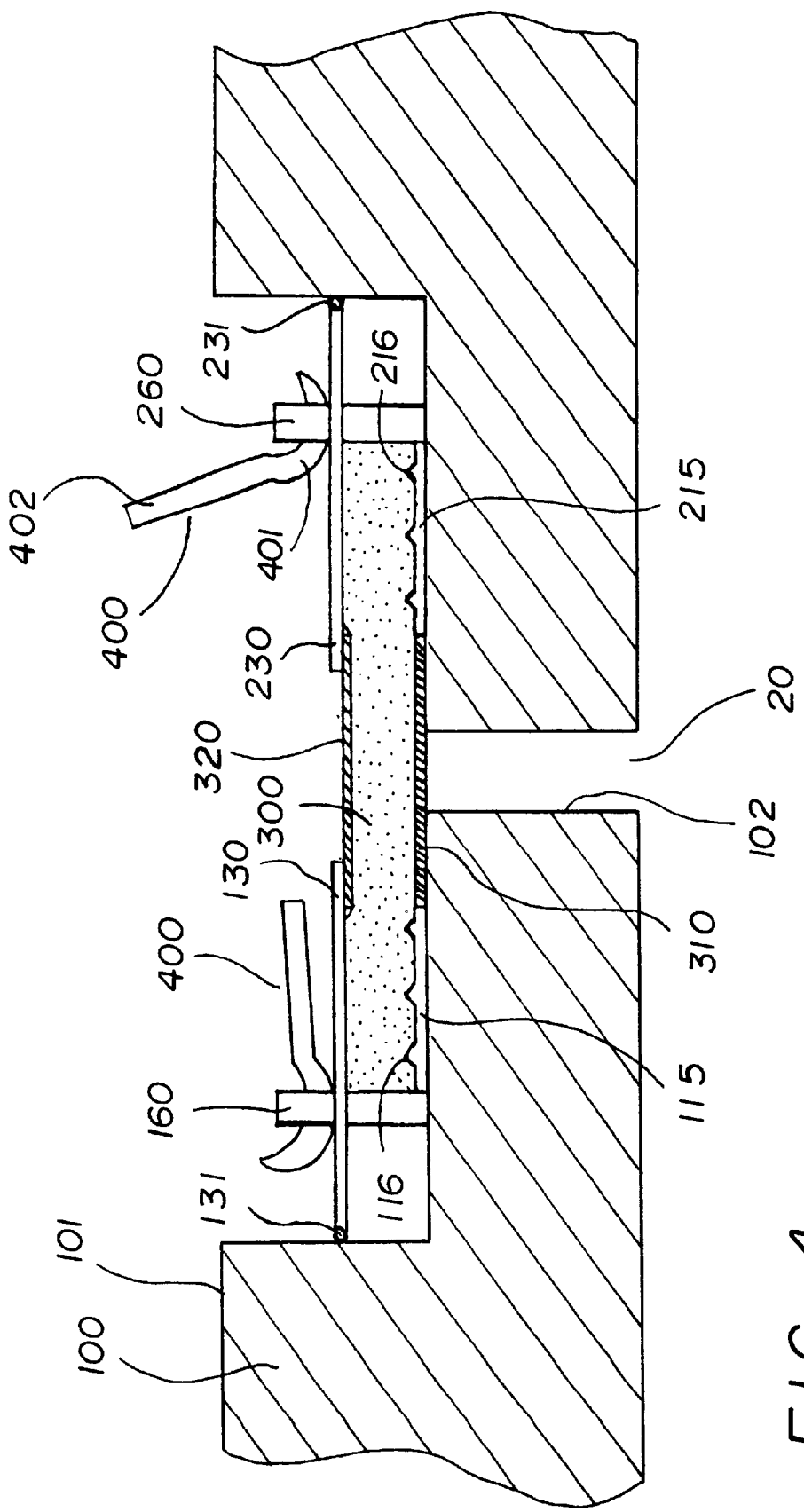
FIG. 4 shows a cross sectional view corresponding to that of FIG. 1 and FIG. 3 in a nearly connected and sealed position.

FIG. 4 shows a cross section corresponding to FIG. 1 and FIG. 3, with the exception that the connecting device according to the invention is nearly at a connected or sealed position.

FIG. 4 shows an example of a tightening member generally designated 400, shaped like a hook with a gradually increased thickness from the pointed end 401 of the same and equipped with a handle 402 for its operation. In the left part of FIG. 4, at container 100, the tightening member 400 has been entered into the remaining free opening of the hoop shaped holding member 160 and lowered towards the pressure exerting member 130 so as to establish a pressure force onto the same and thereby onto the sealing member 300 and the supporting surface beneath. In the right hand part of FIG. 4, at container 200, the tightening member is partly inserted into the remaining free opening of the holding member 160, ready to force the pressure exerting member 230 down towards the sealing member 300 beneath by moving the handle 402 down towards the pressure exerting member 230.

The protection board 320 is further provided in the region between the respective containers and between the upper surface of the sealing member 300 and the lower surface of the respective pressure exerting members 130 and 230, thus establishing primarily a mechanical protection for the sealing member 300.

FIG. 4 also shows a preferred embodiment where long and narrow substantially bar shaped supporting members 115 and 215 are arranged on the supporting surface between the holding members 160 and the outer free moveable protecting board 310. Members 115 and 215 project substantially along the entire area of the surface, e.g. the floor, of the relevant container section. The supporting member 115 is further provided with a rib shaped surface that runs along the light opening of the container. In this way an extra sealing for prevention of any intrusion of liquid media is obtained with reduced free space for the sealing member and the enhanced compression of the same. In addition the supporting member 115 can be used as support for an electric conducting member (e.g. chicken wire) stretched over the supporting member 215 of the other container for the purposes of EMP safeguarding.

Figure 5:
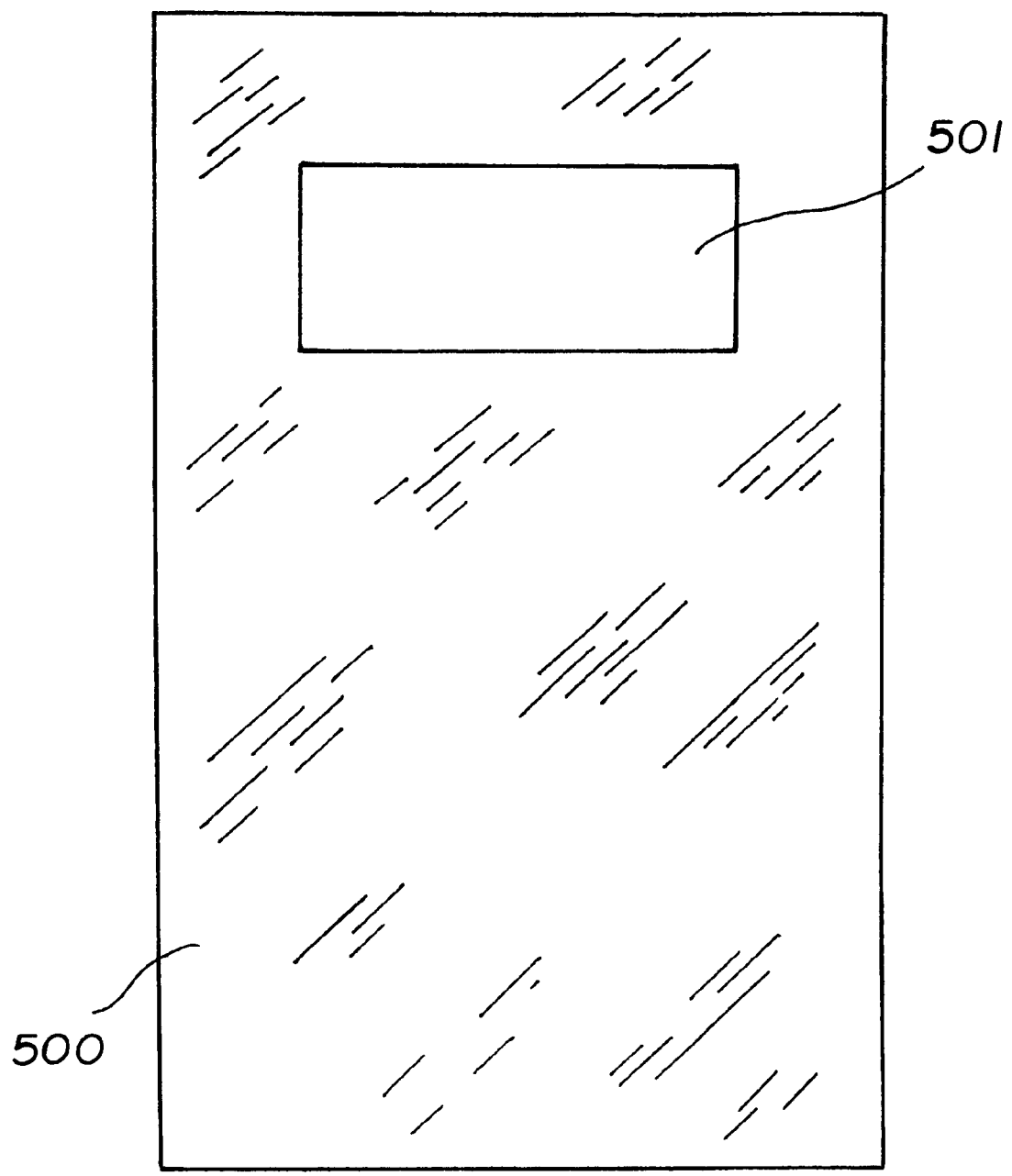
FIG. 5 shows a stop disk to change the pressure on the sealing member.

FIG. 5 shows a drawing of a substantially board shaped spacing member 500 provided with an opening 501 corresponding to the openings 132 of the pressure exerting member 130. The spacing member 500 can be used for reducing the remaining free opening of the holding member 160 (and 260) thus enabling a potentially larger pressure force and compression of the sealing member.

In the above description and the accompanying drawings only preferred embodiments are shown. A person skilled in the art will on the basis of his basic knowledge be able to design alternative embodiments within the general concept of the invention. As an example the generally U-shaped holding member can be designed as a hook with an open side. Alternatively the substantially board shaped pressure exerting member may be designed with an angle in its back edge and hinged to the bottom of the container or the supporting surface of the recessed (lower) part of the same. In a less preferred embodiment the connecting device according to the invention may be attached directly to the floor part of the container without the use of a recessed floor section. In the latter case the connecting device should be covered at least at the floor section by some kind of door sill. In addition the board shaped pressure exerting members 130 may be divided into several sections along e.g. a floor section or constitute a unity that alone runs along the entire floor section In an alternative embodiment the pressure exerting member 130 is provided with a longitudinal upturned edge with a height that may be less than a fourth of its width. Together with this pressure exerting member a holding member may be used that differs from the one described as 160 in that it has a hook shape or "L"-shape with an outwardly open side. It may e.g. be designed with a sharp angle with a narrow edge by the projecting end of a bracket of sheet material, with an angle of the said edge of 3°–5° relative to the supporting surface.

Alternatively a wedge may be used as a tightening member with a substantially board shaped wedge section and a corresponding angle so that contact over a surface area is obtained when it is used. The wedge may be equipped with a projecting end part or "head" in order to be knocked in or out. This embodiment has the advantage that the pressure exerting member may be exposed to pressure farther from its axis. At the same time this solution is based on simple elements that may be used with no training. The connection of two containers may be made by one person in a relatively short time.

In a further alternative embodiment a projecting "paw" with an inward notch from below into its free end may be used. The "paw" may have a fork shaped lever with a crosspeg which can be positioned into the notch while the holding member is being forced in.

When using the above described alternative embodiments for actuating the wedge effect, use of the wedge provides a balance in the force exerted. This makes it possible to eliminate the hinge of the pressure exerting member to the container. It also makes a more complicated mounting operation, but may give a satisfactory connecting effect.

What is claimed is:

1. Device for establishing a connection in a horizontal plane between two or more containers (100, 200) of the iso-container type, the device including a substantially band shaped, elastic sealing member (300) which surrounds a free opening (20) between the containers to be connected and which is arranged on a supporting surface (105), pressure exerting member (130) to hold the sealing member (300) tightly against the supporting surface (105), and tightening member (400) to force the sealing member (300) against the supporting surface (105), characterized in that the sealing member (300) in mounted position is arranged with a generally rectangular cross section and is placed on a supporting surface (105) on the respective containers, that the pressure exerting member constitutes at least four generally band shaped members (130) arranged at the respective flat supporting surfaces (105) of a container (100), whereas the pressure exerting member (130) is connected to the container with a hinge member (131) along one of its long edges so that it can swing from an elevated position to a lower position and being provided with openings (132), that a plurality of holding members (160) are firmly attached to the supporting surface (105) and are evenly distributed along the entire opening, and that a plurality of tightening members (400) are arranged to enter the respective holding members (160) to force the pressure exerting member (130) against the sealing member (300) and the supporting surface (105).

2. Device according to claim 1, characterized in that it is arranged in a recess (104, 105) in an end part of the containers.

3. Device according to claim 1, characterized in that the holding member (160) is designed as a substantially U-shaped hoop with its legs attached to the supporting surface (105).

4. Device according to claim 1, characterized in that a free moving protection board (310) is arranged in the region between the supporting surface (105) and the sealing member (300) and over the free opening (20) between the two adjacent containers (100, 200).

5. Device according to claim 1, characterized in that a free moving inner protection board (320) is arranged in the region between the sealing member (300) and the underside of the pressure exerting member (130 and 230) of the respective containers (100, 200).

6. Device according to claim 1, characterized in that the tightening member (400) is shaped as a hook (401) with a handle (402), wherein the hook has a free pointed end and is gradually thicker towards the handle.

7. Device according to claim 1, characterized in that a long and narrow bar shaped supporting member (115) is arranged on the supporting surface (105), the upper surface of said bar shaped supporting member (115) including projections or bars (116) projecting in a direction towards the sealing member (300).

8. Device according to claim 1, characterized in that a spacing member (500) provided with openings (501) is arranged on the upper side of the pressure exerting member (130) with the opening (501) located over the holding member (160).

9. Device according to claim 1, characterized in that the pressure exerting member (130) at one or both ends is equipped with a second hinge member (133) oriented substantially perpendicular to the first hinge member (131) so as to establish a flap which can swing around an axis perpendicular to the first hinge member (131).

10. Device for connecting in a horizontal plane two or more containers of the iso-containers type said device including a substantially band shaped elastic sealing member which surrounds a free opening between the containers to be connected wherein a pressure exerting member is arranged on a supporting surface, to hold the sealing member against the supporting surface and a tightening member is provided to force the sealing member against the supporting surface, characterized in that the sealing member in a mounted position is arranged with a substantially rectangular cross section and is arranged on a supporting surface of the respective containers, that the pressure exerting member consists of at least four substantially board shaped members arranged at the respective flat supporting surfaces of a container, that holding members are firmly attached to the supporting surface, a plurality of said holding members being evenly distributed along the entire opening, and that a plurality of tightening members are arranged to be inserted into the respective holding members in order to force the pressure exerting member against the sealing member and the supporting member, said tightening members being arranged to cooperate with the holding members with contact over a certain area or over several separate contact points.

* * * * *